United States Patent [19]

Tsuchida et al.

[11] 4,402,048

[45] Aug. 30, 1983

[54] METHOD OF AND APPARATUS FOR INDICATING REMAINING FUEL QUANTITY FOR VEHICLES

[75] Inventors: Takashi Tsuchida, Chiryu; Kazukiyo Okada, Kosai; Yutaka Okuda, Kariya; Nobuo Kondo, Anjo; Toshio Shinohara, Toyota, all of Japan

[73] Assignees: Toyota Jidosha Kogyo Kabushiki Kaisha, Toyota; Nippondenso Co., Ltd., Kariya, both of Japan

[21] Appl. No.: 242,823

[22] Filed: Mar. 12, 1981

[30] Foreign Application Priority Data

May 3, 1980 [JP] Japan ..................... 55-58825

[51] Int. Cl.³ ............................................ G01M 15/00
[52] U.S. Cl. ..................... 364/442; 73/113; 340/612; 364/509; 364/571
[58] Field of Search ............ 364/424, 442, 552, 554, 364/575, 577, 573, 509, 154, 571; 73/113, 114; 235/92 FL, 92 DN; 340/612, 623; 377/9, 21

[56] References Cited

U.S. PATENT DOCUMENTS

| | | | |
|---|---|---|---|
| 3,881,651 | 5/1975 | Wilhelm, Jr. | 364/154 |
| 3,946,212 | 3/1976 | Nakao et al. | 364/154 |
| 3,981,767 | 9/1976 | Al-Shaikh | 364/154 |
| 4,046,998 | 9/1977 | Kuno et al. | 235/92 DN |
| 4,249,242 | 2/1981 | Fleurier | 73/114 |

*Primary Examiner*—Errol A. Krass
*Attorney, Agent, or Firm*—Cushman, Darby & Cushman

[57] ABSTRACT

A method of and an apparatus for indicating a remaining fuel quantity for vehicles, designed to digitally indicate the quantity of fuel remaining in the fuel tank of a vehicle. The method of and the apparatus for repeating the operations of performing sampling detection of an amount of fuel remaining in the fuel tank of a vehicle, determining a center value for a plurality of remaining fuel quantity values detected by a microcomputer, determining limit values each thereof being apart from the center value by a predetermined amount, using any subsequent detected value exceeding the limit values as a new limit value, computing an average value of a predetermined number of detected sampling values, and indicating it on a display.

10 Claims, 8 Drawing Figures

METHOD OF AND APPARATUS FOR INDICATING REMAINING FUEL QUANTITY FOR VEHICLES

BACKGROUND OF THE INVENTION

1. Field of the Invention

The present invention relates to a method of and an apparatus for indicating a remaining fuel quantity for vehicles, which are designed to digitally indicate an amount of fuel remaining in the fuel tank of a vehicle.

2. Description of the Prior Art

Remaining fuel quantity meters which have heretofore been installed in vehicles are generally designed so that the position of a float on the surface of fuel in a fuel tank is transmitted to a fuel-sender by way of a cam and the current flowing through a resistance wire wound on a bimetal is limited by the resistance value of the fuel-sender, thereby causing the indication of the bimetal to correspond to the remaining fuel quantity.

However, this type of remaining fuel quantity meter has a disadvantage of causing an abrupt change in the level of fuel in the fuel tank at a sudden transition time, e.g., at the time of starting, stopping or sharp turning movement of the vehicle. Another disadvantage is that particularly when the vehicle is turning such as when running along an interchange of an expressway, as shown in the fuel level variation diagram of FIG. 1a (the ordinate represents the fuel level H and the abcissa represents the elapsed time T), the indicated value of the fuel-sender is positioned near the empty end or the full end of the gage, thus failing to indicate the accurate remaining fuel quantity, and, in particular, the indicated value is subject to considerable variations in cases where the remaining fuel quantity is displayed digitally. The present invention has been made with a view to eliminating the foregoing disadvantages of the prior art methods.

SUMMARY OF THE INVENTION

It is an object of the present invention to provide an improved remaining fuel quantity indicating method and apparatus for vehicles, capable of indicating a quantity of fuel remaining in the fuel tank stably in spite of any sudden variation in the fuel level by determining a center value of a plurality of detected values for the quantity of fuel remaining in the fuel tank, determining limit values each thereof differing from the center value by a predetermined value, detecting the quantity of fuel remaining in the fuel tank in a sampling manner, using a resultant detected value as a new one of the limit values when the former is beyond the latter, and computing and indicating an average value of the detected sampling values.

It is another object of the present invention to provide such remaining fuel quantity indicating method of and apparatus for vehicles, capable of performing, in addition to the function of obtaining the average value of the detected sampling values, a function of discriminating and eliminating any suddenly changed abnormal detected values due to changes in the attitude of the vehicle thereby indicating the remaining fuel quantity stably.

Thus, the remaining fuel quantity indicating method and apparatus for vehicles in accordance with the present invention have a great advantage that, even if changes of the attitude of a vehicle take place with the detected values remaining beyond the limit values over a long period of time, the indication of the remaining fuel quantity is controlled to vary slowly between the center value and the limit values and thereby to indicate the remaining fuel quantity stably in spite of sudden changes of the liquid level in the fuel tank, and further, even if the detection sampling rate increases, it is possible to maintain a good response characteristic and to effect stable indication of the remaining fuel quantity between the center value and the limit values.

BRIEF DESCRIPTION OF THE DRAWING

In the drawings, like reference numerals refer to like steps or elements.

DESCRIPTION OF THE PREFERRED EMBODIMENTS

The present invention will now be described in greater detail with reference to the illustrated embodiments.

Figure 2:
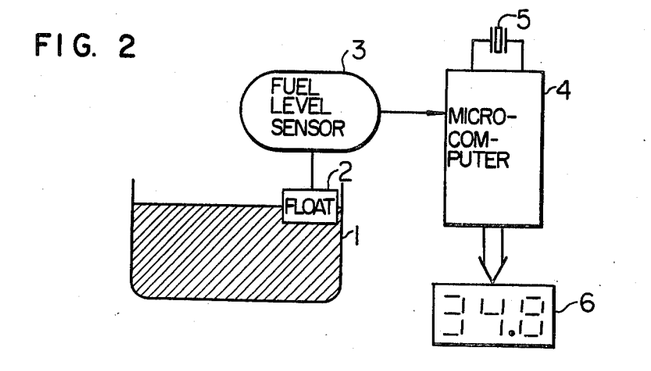
FIG. 2 is a schematic diagram showing the overall construction of an apparatus used in a first embodiment of the present invention.

In FIG. 2 showing the overall construction of an apparatus used in a first embodiment of the invention, numeral 1 designates a vehicle fuel tank, 2 a float floating on the surface of the fuel in the fuel tank 1, and 3 a fuel level sensor for sensing the position of the float 2 in terms of a resistance value to generate a fuel level signal corresponding to the float position.

Numeral 4 designates a microcomputer for performing the software digital computing operations in accordance with a control program including a predetermined indication program. The microcomputer 4 is connected to a quartz oscillator unit 5 of several MHz and is brought into operation upon receipt of a stabilized voltage supply from a stabilized power supply circuit (not shown) which generates a stabilized voltage of 5 volts when it receives a power supply from the vehicle-mounted battery. The microcomputer 4 comprises a single-chip large-scale integrated circuit including as its main components a read-only memory (ROM) for storing a control program including an indication program which determines an operational procedure, a central processing unit (CPU) for sequentially reading the control program in the ROM and executing the corresponding operational process, a read/write memory (RAM) for temporarily storing various data associated with the computing operations of the CPU which data can be read out by the CPU, a clock generator including the quartz oscillator unit 5 for generating reference clock pulses required for the various computing operations, an A/D converter unit for converting input analog signals to digital signals, and an I/O circuit for controlling the inputting and outputting of various signals.

The microcomputer 4 operates such that in response to the fuel level signals from the fuel level sensor 3 and the signals from other various sensors (not shown), various computing operations are performed to generate indication command signals necessary for displaying a remaining fuel quantity and control command signals necessary for performing various control operations. Numeral 6 designates a display unit responsive to the indication command signals from the microcomputer 4 to hold the signals and digitally indicate the corresponding remaining fuel quantity.

Figure 3:
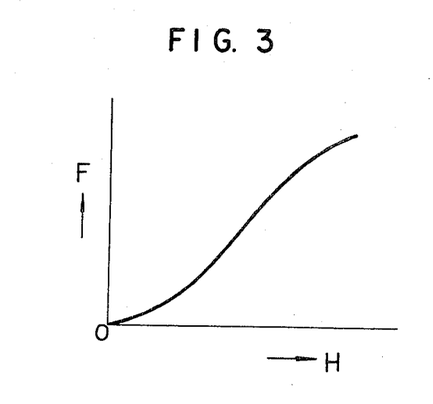
FIG. 3 is a characteristic diagram showing the relationship between the liquid level in the fuel tank and the remaining fuel quantity.
Figure 4:
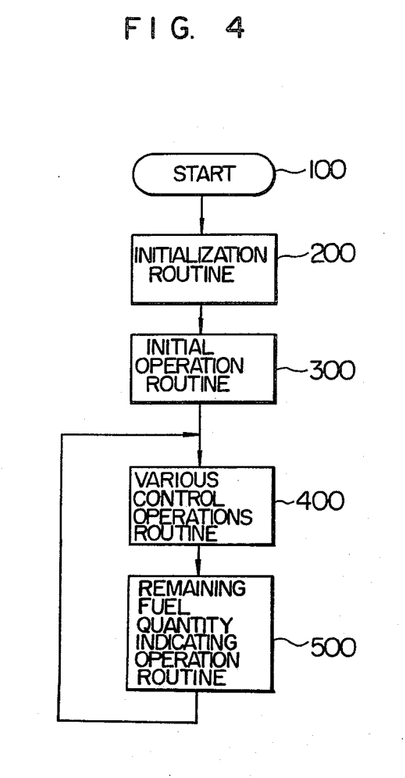
FIG. 4 is an operational flow chart showing the overall processing system of the microcomputer of FIG. 2, which is executed according to a control program.
Figure 5:
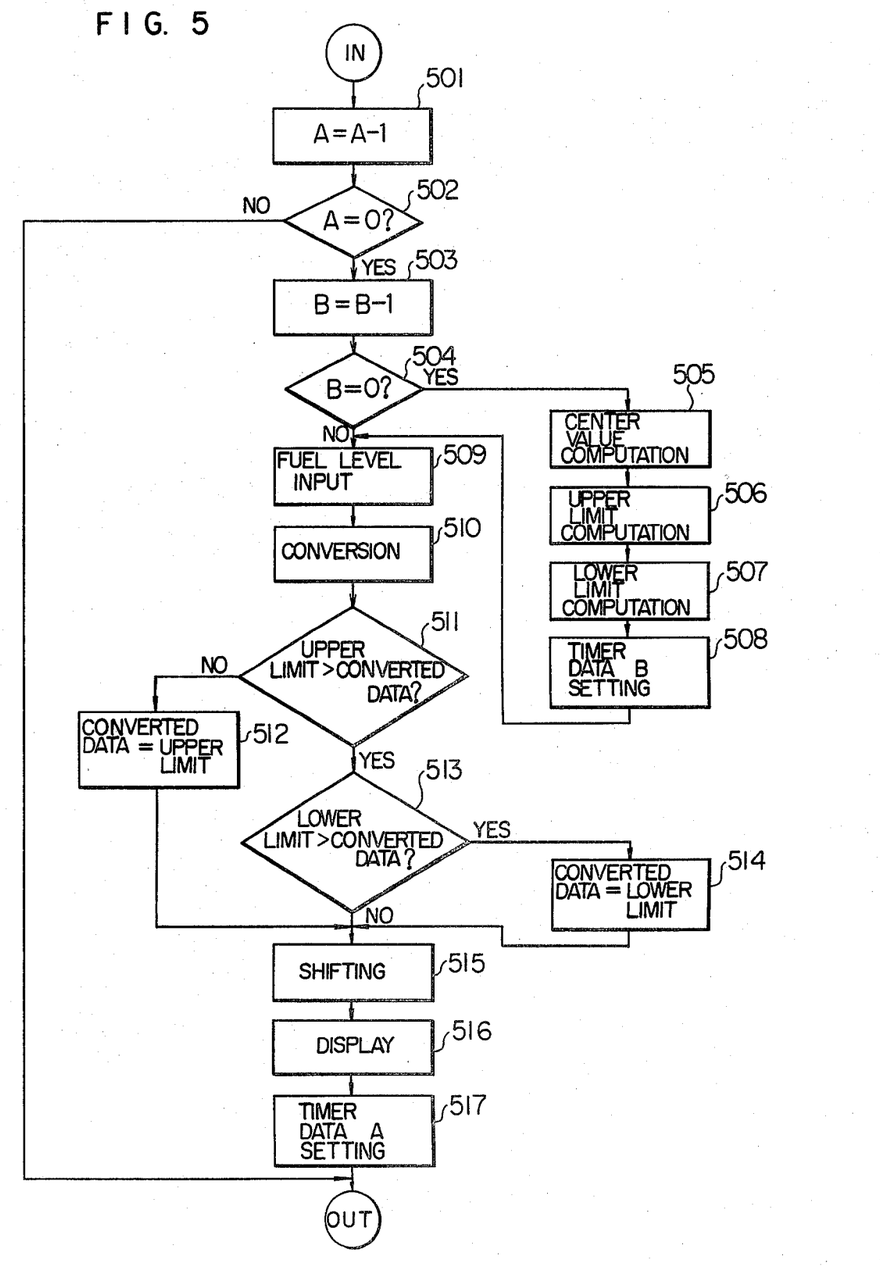
FIG. 5 is an operational flow chart showing the detailed processing steps of the remaining fuel quantity indicating operational routine shown in FIG. 4.

FIG. 3 is a characteristic diagram showing the relationship between the fuel level H and the fuel quantity F in the fuel tank 1, and FIG. 4 is an operational flow chart showing the overall operational process of the microcomputer 4 which is performed in accordance with the control program. FIG. 5 is an operational flow chart showing the detailed processing steps of the remaining fuel quantity indicating operational routine shown in FIG. 4.

Firstly, the computing operations of the microcomputer 4 will be described. When the key switch of the vehicle equipped with the apparatus of this invention is turned on to start the vehicle, the microcomputer 4 is supplied with a stabilized voltage from the vehicle-mounted battery through a stabilized power supply circuit (not shown). This brings the microcomputer 4 into operation to execute the operational process according to the control program at a period of time of about several hundreds msec.

More specifically, the operational process is initiated at a start step 100 in FIG. 4 and then the process proceeds to an initialization routine 200 so that the registers, the counters, etc., in the microcomputer 4 are set to their initial states required for starting the processing. This initializing operation includes the operation of setting a timer data A to a value corresponding to the number of times the operation is repeated in about 30 seconds and the operation of setting a timer data B to "1". After the initialization has been completed, the process proceeds to an initial operation routine 300.

The initial operation routine 300 performs the operations of determining the fuel level H corresponding to the fuel level signal from the fuel level sensor 3 for sensing the level of fuel in the fuel tank 1, determining the fuel quantity F corresponding to the fuel level H in accordance with the relationship of the fuel level H versus the fuel quantity F preliminarily stored in the ROM of the microcomputer 4, namely, the characteristic diagram shown in FIG. 3, sending to the display unit 6 an indication command signal corresponding to the determined fuel quantity F, and then sequentially transferring the fuel quantities F, which have been determined in response to the four fuel level signals from the fuel level sensor 3, to the four assigned locations addressed as $K_1$, $K_2$, $K_3$ and $K_4$ which have been preliminarily allocated in the RAM of the microcomputer 4, and then the process proceess to various control operations routine 400.

The various control operations routine 400 performs control operations necessary for effecting the indications of the meters on the instrument panel which are associated with various sensors and actuators which are not shown in FIG. 2, and then the process proceeds to a remaining fuel quantity indicating operation routine 500.

The operation routine 500 performs computing operations necessary for the remaining fuel quantity indication in accordance with the fuel level signal from the fuel level sensor 3, and then the process returns to the various control operations routine 400. Thereafter, the operations from the various control operations routine 400 to the remaining fuel quantity indicating operation routine 500 are repeated at intervals of about several hundreds msec.

FIG. 5 shows the detailed operational process for the remaining fuel quantity indicating operation routine 500. When the process enters the operation routine 500, the process proceeds firstly to a subtraction step 501 so that the operation of subtracting a constant number "1" from the previously set timer data A, namley, $A = A - 1$, is performed, and then the process proceeds to a timer decision step 502. The timer decision step 502 decides whether the value of the timer data A is zero. If the value of the timer data A is not zero, the result of the decision becomes "NO", and one cycle of the processing of the remaining fuel quantity indicating operation routine 500 is completed. If the value of the timer data A is zero, the result of the decision becomes "YES", and the process proceeds to a subtraction step 503. Then, in the subtraction step 503, similarly to the above-mentioned subtraction step 501, the operation of subtracting a constant number "1" from the timer data B, namely, $B = B - 1$, is performed, and the process proceeds to a timer decision step 504. Here, the subtraction of "1" from the timer data B indicates that 30 seconds have elapsed. The timer decision step 504 decides whether the value of the timer data B is zero. if it is not zero, the result of the decision at the step 504 becomes "NO", and the process proceeds to a fuel level input step 509. On the other hand, if the value of the timer data B is zero, the result of the decision at the step 504 becomes "YES", and the process proceeds to a center value computing step 505. The center value computing step 505 computes a center value of the remaining fuel quantities $F_1$, $F_2$, $F_3$ and $F_4$ which are stored in the assigned locations $K_1$, $K_2$, $K_3$ and $K_4$ in the RAM of the microcomputer 4 by the following equation:

$$\text{center value } (F_S) = (F_1 + F_2 + F_3 + F_4)/4$$

Then, the process proceeds to an upper limit value computing step 506 which computes the sum of the center value ($F_S$) computed by the center value computing step 505 and the fuel quantity ( the amount of fuel consumption), 2 l for example, necessary for the vehicle to travel during a sampling interval (2 minutes) in which the remaining fuel quantities $F_1$, $F_2$, $F_3$ and $F_4$ stored in the RAM of the microcomputer 4 were obtained. In other words, an upper limit value ($F_U$) is computed by the following equation:

$$\text{upper limit value } (F_U) = \text{center value } (F_S) + \text{amount of fuel consumption (2 l)}$$

Then, the process proceeds to a lower limit value computing step 507. The step 507 computes the difference between the center value ($F_S$) computed at the center value computing step 505 and the amount of fuel consumption (2 l) used in the upper limit value computing step 506 by the following equation:

lower limit value $(F_L)$ = center value $(F_S)$ − amount of fuel consumption (2 l)

Then, the process proceeds to a timer data B setting step 508 where the timer data B is set to a value corresponding to the number of times the operation is repeated in about 2 minutes, and then the process proceeds to the fuel level input step 509. The fuel level input step 509 takes in the fuel level signal from the fuel level sensor 3 for sensing the fuel level in the fuel tank 1 and converts it to a digital fuel level ($H_5$), and then the process proceeds to a conversion step 510. The conversion step 510 computes the fuel quantity ($F_5$) corresponding to the fuel level ($H_5$) in accordance with the relationship between the fuel level H and the fuel quantity F preliminarily stored in the ROM of the microcomputer 4, that is, the characteristic diagram shown in FIG. 3, and stores it at a specified location $K_0$ in the RAM of the microcomputer 4, and then the process proceeds to a decision step 511. The decision step 511 compares the upper limit value ($F_U$) computed at the upper limit value computing step 506 with the fuel quantity ($F_5$) obtained at the conversion step 510 and decides the relative magnitude. Thus, if the upper limit value ($F_U$) is smaller than the fuel quantity ($F_5$), the result of the decision at the step 511 becomes "NO", and a subsequent step 512 replaces the upper limit value ($F_U$) by the fuel quantity ($F_5$) stored at the specified location $K_0$ in the RAM of the microcomputer 4, and then the process proceeds to a shift step 515. On the other hand, if the upper limit value ($F_U$) is greater than the fuel quantity ($F_5$), the result of the decision at the step 511 becomes "YES", and the process proceeds to a decision step 513. The decision step 513 compares the lower limit value ($F_L$) computed at the lower limit value computing step 507 with the fuel quantity ($F_5$) obtained at the conversion step 510 to decide the relative magnitude. If the lower limit value ($F_L$) is greater than the fuel quantity ($F_5$), the result of the decision at the step 513 becomes "YES", and a subsequent step 514 replaces the lower limit value ($F_U$) by the fuel quantity ($F_5$) stored at the specified location $K_0$ in the RAM of the microcomputer 4, and the process proceeds to the shifting step 515. On the other hand, if the lower limit value ($F_L$) is smaller than the fuel quantity ($F_5$), the result of the decision at the step 513 becomes "NO", and the process proceeds directly to the shifting step 515. The shifting step 515 shifts the content stored at the specified location $K_0$ in the RAM of the microcomputer 4 to the specified location $K_1$ which have been storing the latest fuel quantity among the four specified locations $K_1$, $K_2$, $K_3$ and $K_4$ in the RAM of the microcomputer 4, the content of the location $K_1$ to the location $K_2$, the content of the location $K_2$ to the location $K_3$, and the content of the location $K_3$ to the location $K_4$, sequentially, thereby changing the contents of these locations, and then the process proceeds to a display step 516. The display step 516 computes an average value of the contents stored in the specified locations $K_1$, $K_2$, $K_3$ and $K_4$ in the RAM of the microcomputer 4 by the following equation, and transfers the resultant value $F_m$ to the display unit 6.

average value $(F_m) = (F_1 + F_2 + F_3 + F_4)/4$

Then, the process proceeds to a timer data A setting step 517 where the timer data A is set to a value corresponding to the number of times the operation is repeated in about 30 seconds. Thus, one cycle of the processing of the remaining fuel quantity indicating operation routine 500 is completed.

Figure 1A:
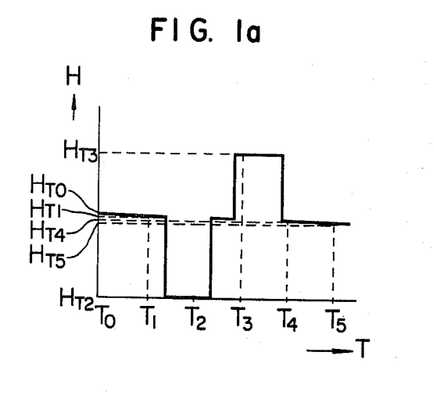
FIGS. 1a and 1b are time charts showing the variations in the level of fuel remaining in the fuel tank.
Figure 1B:
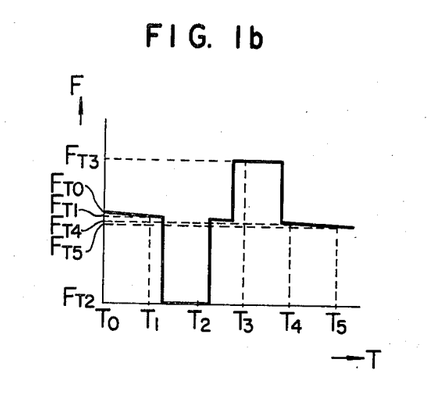

Next, the overall operation of the remaining fuel quantity indication will be described with reference to the remaining fuel level variation diagrams of FIGS. 1a and 1b. The diagram of FIG. 1a shows the variations in the fuel level H given by the fuel level signal from the fuel level sensor 3, and FIG. 1b shows the variations in the fuel quantity F which are obtained by converting the values of the fuel level H of FIG. 1a in accordance with the characteristic diagram of FIG. 3.

When the key switch in the vehicle is turned on thereby to bring the microcomputer 4 into operation, the operational process is initiated starting from the start step 100 shown in FIG. 4. This time point is indicated at $T_0$ in FIG. 1. The process proceeds to the initialization step 200 where various initial setting operations including the setting of the timer data A and B are performed. Then, the process proceeds to the initial operation routine 300. At this step the first fuel level ($H_{T0}$) from the fuel level sensor 3 (i.e., the value of the fuel level at the time point $T_0$ in FIG. 1a) is detected and the corresponding fuel quantity ($F_{T0}$) (i.e., the value of the fuel quantity at the time point $T_0$ in FIG. 1b), 36 l for example, is obtained and displayed. At the same time this fuel quantity ($F_{T0}$) is transferred sequentially to the specified locations $K_1$, $K_2$, $K_3$ and $K_4$ of the RAM, and then the process proceeds to the various control operation routine 400. Thus, as soon as the key switch is turned on, the fuel level is detected and the corresponding fuel quantity is displayed on the display unit 6.

After the indication control operations necessary for the indication of various meters have been performed by the various control operation routine 400, the process enters the remaining fuel quantity indicating operation routine 500 and proceeds firstly to the subtraction step 501. At the step 501 the constant "1" is subtracted from the value of the timer data A, which has been set by the initialization routine 200 to the value corresponding to the number of times the operation is repeated in 30 seconds, to update the timer data A. Then, the process proceeds to the timer decision step 502. Since the value of the timer data A has not become zero, the result of its decision becomes "NO", and one cycle of the processing of the remaining fuel quantity indicating operation routine 500 is completed and the process returns to the various control operation routine 400. Thereafter, the above-mentioned operations are repeated at intervals of several hundreds msec. The previously computed remaining fuel quantity of 36 l continues to be indicated on the display unit 6, since it is not yet the case that the processing of the remaining fuel quantity indicating operation routine 500 has to be initiated to indicate an updated value for a varied remaining fuel quantity.

However, at the expiration of about 30 seconds (i.e., at the time point $T_1$ shown in FIG. 1), the value of the timer data A updated at the subtraction step 501 becomes zero, so that the result of the decision at the subsequent timer decision step 502 changes from "NO" to "YES", and the process proceeds to the next subtraction step 503. At the step 503 the constant "1" is subtracted from the value of the timer data B, which has been set to 1 by the initialization routine, to update the timer data B (B = 1 − 1 = 0), and then the process proceeds to the timer decision step 504. Since the value of the timer data B has become zero, the result of the decision at the timer decision step 504 becomes "YES", and the process proceeds to the center value computing step 505. At the step 505 $F_S=36$ l is obtained from the contents of the RAM stored by the initial operation routine 300, i.e. $F_1=36$, $F_2=36$, $F_3=36$, and $F_4=36$. Then, the process proceeds to the upper limit value computing step 506 where the summation of the remaining fuel quantity ($F_S$) or 36 l and the fuel quantity 2 l required for the vehicle to travel for 2 minutes is effected to obtain $F_U=36$ l$+2$ l$=38$ l. Then, the process proceeds to the lower limit value computing step 507 where the subtraction is effected to obtain $F_L=36$ l$-2$ l$=34$ l. The next timer data B setting step 508 sets the timer data B to 4 corresponding to the number of times the operation is repeated in 2 minutes, and then the process proceeds to the fuel level input step 509.

The fuel level input step 509 determines the fuel level ($H_{T1}$) at the time point $T_1$ in FIG. 1*a*, and the process proceeds to the conversion step 510. The step 510 determines the fuel quantity ($F_{T1}$), 35 l for example, at the time point $T_1$ in FIG. 1*b* corresponding to the fuel level ($H_{T1}$). Then, the process proceeds to the decision step 511 where the upper limit value of 38 l computed at the upper limit value computing step 506 is compared with the converted data of 35 l to reach its decision "YES", and the process proceeds to the decision step 513. The decision step 513 compares the lower limit value of 34 l computed at the lower limit value computing step 507 with the converted data of 35 l to reach its decision "NO". As a result, the remaining fuel quantity of 35 l obtained at the fuel level input step 509 and the conversion step 510 is decided to fall within the range between the upper limit value and the lower limit value, and the process proceeds to the shifting step 515. The shifting step 515 shifts and changes the contents stored at the locations $K_1$, $K_2$, $K_3$ and $K_4$ in the RAM so that $K_1=35$, $K_2=36$, $K_3=36$, and $K_4=36$ may result, and then the process proceeds to the display step 516 which sends to the display unit 6 an average value of the values stored at the locations $K_1$, $K_2$, $K_3$ and $K_4$, namely, $(35+36+36+36)/4 \approx 35.8$. Then, the process proceeds to the timer data A setting step 517 so that the timer data A is set and the first time processing of the remaining fuel quantity indicating operation routine 500 is completed, and the process returns to the various control operations routine 400.

When the operational process from the various control operations routine 400 to the remaining fuel quantity indicating operation routine 500 (one cycle of the processing is completed when the process returns from the subtraction step 501 through the decision step 502 in FIG. 5) is repeated and the elapsed time reaches about 30 seconds (at a time $T_2$ in FIG. 1), the result of the decision at the decision step 502 changes from "NO" to "YES", and the process proceeds to the subtraction step 503. At the step 503 the constant "1" is subtracted from the value of the timer data B set at the preceding timer data B setting step 508 and the timer data B is updated ($B=4-1=3$). Then, the process proceeds to the timer decision step 504. Since the value of the timer data B has not become zero, the result of the decision at the step 504 becomes "NO" and the process proceeds to the fuel level input step 509. At fuel level input step 509 the fuel level ($H_{T2}$) at the time $T_2$ in FIG. 1*a* is obtained. Then, the process proceeds to the conversion step 510 where the fuel quantity ($F_{T2}$) at the time $T_2$ in FIG. 1*b*, that is, 0 l, corresponding to the fuel level ($H_{T2}$) is obtained. Then, the process proceeds to the decision step 511 where the upper limit value of 38 l is compared with the converted data of 0 l and the result of its decision becomes "YES". Then, the process proceeds to the next decision step 513. The decision step 513 compares the lower limit value of 34 l with the converted data of 0 l and the result of its decision becomes "YES". Thus, since the converted data is 0 l, at the next step 514 the lower limit value of 34 l is taken as a new converted data value and the process proceeds to the shifting step 515. At the step 515 the contents of the RAM are shifted so that $K_1=34$, $K_2=35$, $K_3=36$, and $K_4=36$ may result, and then the process proceeds to the display step 516.

The display step 516 computes an average value of the contents of the locations $K_1$, $K_2$, $K_3$ and $K_4$, namely, $(34+35+36+36)/4 \approx 35.3$, and sends the result to the display unit 6. Next, the timer data A setting step 517 sets the timer data A, and the process returns to the various control operations routine 400.

Then, at the expiration of another about 30 seconds, that is, at a time $T_3$ in FIG. 1, the result of the decision at the decision step 502 changes from "NO" to "YES" and the process proceeds to the subtraction step 503. At the step 503 the constant "1" is subtracted from the value of the timer data B to update the value thereof by $B=3-1=2$, and then the process proceeds to the timer data decision step 504. Since the value of the timer data B has not yet become zero, the result of the decision at the step 504 becomes "NO", and the process proceeds to the fuel level input step 509. The fuel level input step 509 obtains the fuel level ($H_{T3}$) at the time $T_3$ in FIG. 1*a*, and the process proceeds to the conversion step 510 which obtains the fuel quantity ($F_{T3}$), 58 l for example, at the time $T_3$ in FIG. 1*b* corresponding to the fuel level ($H_{T3}$). Then, the process proceeds to the decision step 511 where the upper limit value of 38 l is compared with the converted data of 58 l to decide the relative magnitude. Thus, the result of the decision at the step 511 becomes "NO". Since the converted data value is 58 l, the step 512 selects the upper limit value of 38 l as a new converted data value, and then the process proceeds to the shifting step 515. At the step 515 the contents of the RAM are shifted so that $K_2=38$, $K_2=34$, $K_3=35$, and $K_4=36$ may result, and then the display step 516 sends to the display unit 6 an average value of the contents of the locations $K_1$, $K_2$, $K_3$ and $K_4$, namely, $(38+34+35+36)/4 \approx 35.8$. Then, the timer data A setting step 517 sets the timer data A and the process returns to the various control operations routine 400.

Then, at the expiration of still another about 30 seconds, that is, at the time $T_4$ in FIG. 1, the result of the decision at the decision step 502 changes from "NO" to "YES", and the process proceeds to the subtraction step 503 to update the timer data B as $B=2-1=1$. Then, the process proceeds to the timer decision step 504 where the result of its decision becomes "NO", and the process proceeds to the fuel level input step 509. The step 509 obtains the fuel level ($H_{T4}$) at the time $T_4$ in FIG. 1*a*, and the process proceeds to the conversion step 510. The step 510 obtains the fuel quantity ($F_{T4}$), 34 l for example, at the time $T_4$ in FIG. 1*b* corresponding to the fuel level ($H_{T4}$). Then, the process proceeds to the decision step 511. Since the upper limit value is 38 l, the result of the decision at the step 511 becomes "YES", and the process proceeds to the decision step 513. Since the lower limit value is 34 l, the result of the decision at the step 513 becomes "NO", and the process proceeds to the shifting step 515. The step 515 shifts and changes the contents of the locations $K_1$, $K_2$, $K_3$ and $K_4$ of the RAM to 34, 38, 34 and 35, respectively, and the process proceeds to the display step 516, which delivers to the display unit 6 an average value of the contents of the locations $K_1$, $K_2$, $K_3$ and $K_4$, that is, $(34+38+34+35)/4 \approx = 35.3$. Then, the process returns to the various control operations routine 400 through the timer data setting step 517.

Then, at the expiration of further another about 30 seconds, that is, at the time $T_5$ in FIG. 1, the result of the decision at the decision step 502 changes from "NO" to "YES", and the process proceeds to the subtraction step 503 to update the timer data B as $B=1-1=0$. Then, the process proceeds to the timer decision step 504 where the result of its decision becomes "YES", and the process proceeds to the center value computing step 505. The step 505 obtains a center value $(F_S)=(34+38+34+35)/4 \approx 35.3$ by the contents of the locations $K_1$, $K_2$, $K_3$ and $K_4$ in the RAM. Then, the upper limit value computing step 506 computes an upper limit value by $35.3+2=37.3$, and the lower limit value computing step 507 computes a lower limit value by $35.3-2=33.3$, which upper and lower limit values are maintained until the next 2 minutes elapses. Then, the process proceeds to the fuel level input step 509 via the timer data B setting step 508, and at the step 509 the fuel level ($H_{T5}$) at the time $T_5$ in FIG. 1a is obtained. Then, the process proceeds to the conversion step 510 where the fuel quantity ($F_{T5}$), 33.5 l for example, at the time $T_5$ in FIG. 1b corresponding to the fuel level ($H_{T5}$) is obtained, and the process roceeds to the decision step 511. Since the upper limit value is now 37.3 l, the result of the decision at the step 511 becomes "YES", and the process proceeds to the decision step 513. Since the lower limit value is now 33.3 l, the result of the decision at the step 513 becomes "NO", and the process proceeds to the shifting step 515. The shifting step 515 shifts and changes the contents stored at the locations $K_1$, $K_2$, $K_3$ and $K_4$ in the RAM so that $K_1=33.5$, $K_2=34$, $K_3=38$, and $K_4=34$ may result, and then the process proceeds to the display step 516. The step 516 computes an average value of the contents stored at the locations $K_1$, $K_2$, $K_3$ and $K_4$, namely, $(33.5+34+38+34)/4 \approx 34.9$, which is delivered to the display unit 6. Then, the process returns to the various control operations routine 400 through the timer data A setting step 517.

Thereafter, in the like manner as mentioned above, the process of updating the display at every expiration of about 30 seconds and computing upper and lower limit values with respect to a center value at every expiration of about 2 minutes is executed repeatedly.

While, in the above-described first embodiment, an average value of the contents of the locations $K_1$, $K_2$, $K_3$ and $K_4$ in the RAM is delivered to the display unit 6 and a center value ($F_S$) is determined as an average value of the contents of the four storage locations, it is possible to make an average value serve as a center value as well, thereby eliminating the steps 504 to 508 in FIG. 5 and determining upper and lower limit values each thereof to have a difference of 2 l from the average value to be used for the display. Further, an average value to be used for the display may be obtained from the contents of the eight storage locations $K_1$ to $K_8$ in the RAM and the contents of the four storage locations $K_1$ to $K_4$ which are earlier in time than the other four storage locations may be averaged to give a center value ($F_S$).

Figure 6:
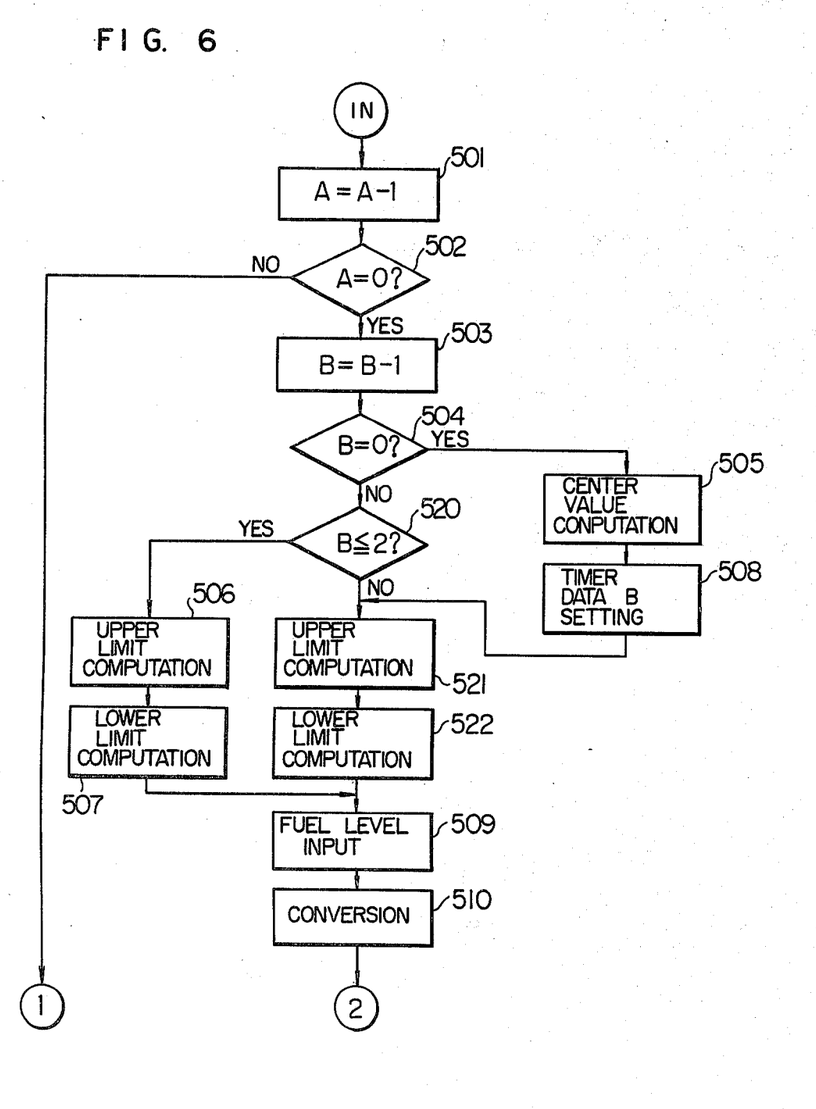
FIGS. 6 and 7 are operational flow charts showing the detailed processing steps of a remaining fuel quantity indicating operational routine used in a second embodiment of the present invention.
Figure 7:
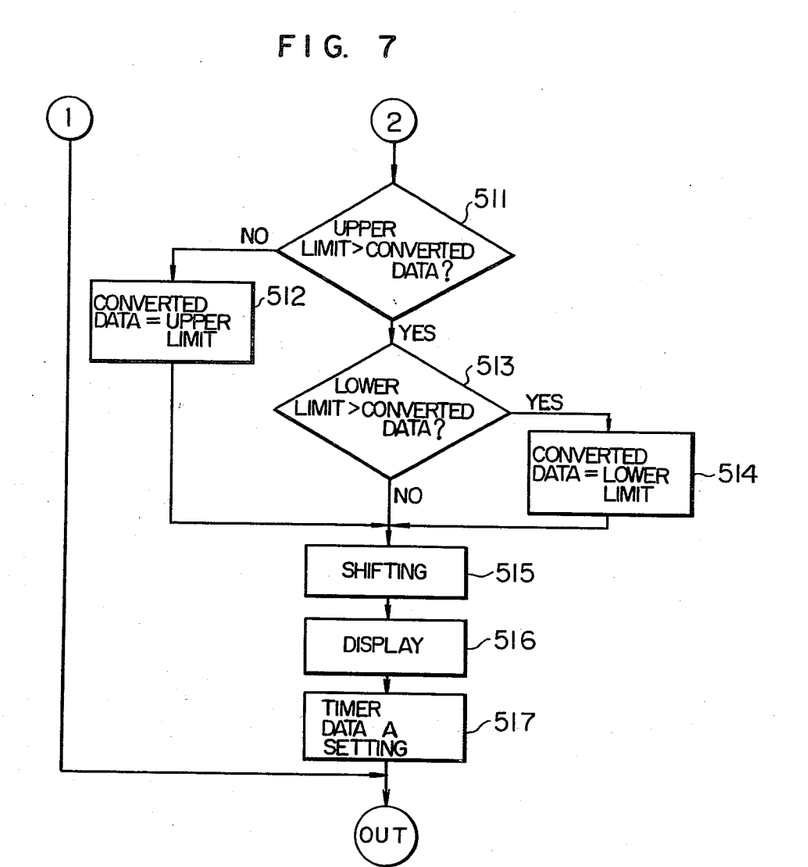

Next, a brief explanation will be given of a second embodiment of the invention shown in the operational flow charts of FIGS. 6 and 7. The operational flow charts of FIGS. 6 and 7 correspond to the operational flow chart of FIG. 5. In the operational flow chart of FIG. 6, steps 520, 521, 522, 506 and 507 compute upper and lower limit values with respect to a current center value ($F_S$) at every expiration of about 1 minute and the remaining fuel quantity is determined from these upper and lower limit values in the same way as the first embodiment. Firstly, the step 520 decides whether the value of the timer data B is $B>2$. When the elapsed time is shorter than 1 minute (in other words, when the value of the timer data B is 3 at the start of the operational process for the remaining fuel quantity indication), the result of the decision at the step 520 becomes "NO", and the process proceeds to the upper limit value computing step 521. The upper limit value computing step 521 provides the sum of a center value ($F_S$) given by a center value computing step 505 and the amount of fuel required for the vehicle to travel one minute, namely, 1 l, for example. Namely, an upper limit value is computed from the following equation:

upper limit value ($F_{U1}$)=center value ($F_S$)+amount of fuel comsumption (1 l)

Then, the process proceeds to the lower limit value computing step 522 where a lower limit value is computed from the following equation which determines the difference between the center value ($F_S$) and the amount of fuel consumption in 1 minute, namely, 1 l:

lower limit value ($F_{L1}$)=center value ($F_S$)−amount of fuel consumption (1 l)

Then, the process proceeds through a series of processing steps from a fuel level input step 509 to a timer data setting step 517, thereby performing operations necessary for the remaining fuel quantity indication in the same manner as the first embodiment. On the other hand, when the elapsed time is longer than 1 minute (if the timer data B is 2 or 1), the result of the decision at the step 520 becomes "YES", and the process proceeds to the upper limit value computing step 506. In the same way as the first embodiment, the upper limit value computing step 506 performs the operation: upper limit vaue ($F_{U2}$)=center value ($F_S$)+amount of fuel consumption (2 l); and the lower limit value computing step 507 performs the operation: lower limit value ($F_{L2}$)=center value ($F_S$)−amount of fuel consumption (2 l). Then, the operation of the remaining fuel quantity indication is performed in the same manner as the first embodiment through the fuel level input step 509, et seq.

As will be seen from the foregoing, in the second embodiment a given side width for the limit values is selected to be 1 l for the time interval shorter than 1 minute after the center value ($F_S$) has been determined, and when the elapsed time exceeds 1 minute, the given side width for the limit values is selected to be 2 l. Thus, by changing the given side width value at every time lapse of 1 minute, it is possible to further reduce the influence of noise caused by the variations in the fuel level and thereby to obtain a more stable display of the remaining fuel quantity.

While, in the above-described embodiments, the average value ($F_S$) is determined from the average value of the fuel quantities (F) obtained by the fuel level signals from the fuel level sensor 3, it is also possible to determine the center value ($F_S$) for the remaining fuel quantity detection by utilizing fuel injection signals from an electronic fuel injection quantity control system which are applicable to other control information.

Further, the given side width value with respect to the center value ($F_S$), which is used in determining the upper and lower limit values, may be varied by using an average vehicle speed during the preceding detection sampling period as a parameter. It is also possible to detect an inclination of the vehicle, for example, and to provide a difference between both side width values for the upper and lower limit values in accordance with the vehicle inclination.

Still further, while the fuel quantity (F) obtained by the fuel level signals from the fuel level sensor is compared, at the decision steps, with both of the upper limit value ($F_U$) and the lower limit value ($F_L$) preset with respect to the center value ($F_S$), it is possible to use only one of the limit values preset with respect to the center value and the other limit value may be one which is obtained on the basis of another parameter.

We claim:

1. A method for digitally computing and indicating a quantity of fuel remaining in a fuel tank of a vehicle, comprising the steps of:
    detecting the quantity of fuel remaining in said fuel tank in a sampling manner;
    determining a center value of the detected remaining fuel quantity values;
    determining upper and lower limit values each of which is displaced in opposite directions from said center value by a predetermined amount;
    replacing said upper limit value by a detected remaining fuel quantity value when the same exceeds said upper limit value and replacing said lower limit value by a detected remaining fuel quantity value when the same becomes lower than said lower limit value; and
    indicating an average value of a predetermined number of said detected values.

2. A method according to claim 1, wherein after the computation of a first center value, the subsequent computation of center values is stopped and a preceding average value of the detected values is used as a center value.

3. A method according to claim 1, wherein said limit values are obtained by computation each time a predetermined time elapses.

4. A method according to claim 3, wherein said predetermined amount between each of said limit values and said center value is changed to one of a plurality of preset values at every sequential step within said predetermined time.

5. A method according to claim 1, wherein said predetermined amount between each of said limit values and said center value is a variable depending, as a parameter, on an average speed of said vehicle during a detection sampling period preceding the time of computation of said limit values.

6. A method according to claim 1, wherein said predetermined amount between each of said limit values and said center value is a variable depending on a detected angle of inclination of said vehicle as a parameter.

7. A method for indicating a remaining fuel quantity for vehicles, comprising the steps of:
    detecting a liquid level of the fuel remaining in a fuel tank of a vehicle in a sampling manner at predetermined intervals to obtain detected data;
    eliminating an abnormal abruptly changed value in said detected data due to a change of the attitude of said vehicle;
    computing an average value of values of said detected data obtained by a predetermined number of sampling detection operations; and
    indicating said average value.

8. An apparatus for indicating a remaining fuel quantity for vehicles, comprising:
    detecting means for detecting a liquid level of the fuel remaining in a fuel tank of a vehicle;
    control means for computing an average value of a predetermined number of detected liquid level sampling data obtained by said detecting means at predetermined intervals, eliminating any abnormal detected value in said detected data and generating an indication signal indicative of the fuel remaining in said fuel tank; and
    indicator means for receiving said indication signal from said control means and indicating said remaining fuel quantity.

9. An apparatus according to claim 8, wherein said control means includes a microcomputer, and a reference clock signal generator for generating reference clock signals to control the computation by said microcomputer.

10. An apparatus for indicating a remaining fuel quantity for vehicles comprising:
    detecting means for detecting liquid levels of the fuel remaining in a fuel tank of a vehicle;
    microcomputer means for receiving detected signals indicative of the liquid levels from said detecting means, said microcomputer means sampling the detected signals at predetermined intervals and storing the sampled values, computing an average value of a plurality of the sampled and stored values, further computing an upper limit value and a lower limit value from the computed average value in accordance with a predetermined equation for computation, replacing the upper limit value by one of the sampled values to obtain a new upper limit value when the same exceeds the upper limit value and replacing the lower limit value by one of the sampled values to obtain a new lower limit value when the same becomes lower than the lower limit value and storing the new upper limit value and the new lower limit value, respectively, and further computing an average value of the sampled and stored values and generating an indication signal corresponding to the average value; and
    indicator means for receiving the indication signal and digitally indicating the remaining fuel quantity in response to the indication signal.

* * * * *